(12) United States Patent
Arnold

(10) Patent No.: US 6,584,963 B2
(45) Date of Patent: Jul. 1, 2003

(54) THROTTLE LOSS RECOVERY TURBINE AND SUPERCHARGER

(75) Inventor: Steven Don Arnold, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/990,996

(22) Filed: Nov. 16, 2001

(65) Prior Publication Data

US 2002/0059921 A1 May 23, 2002

Related U.S. Application Data

(60) Provisional application No. 60/249,472, filed on Nov. 17, 2000.

(51) Int. Cl.⁷ .................................................. F02B 33/00
(52) U.S. Cl. ...................... 123/559.1; 60/397; 418/173; 418/176
(58) Field of Search ........................ 60/397; 123/559.1; 418/173, 176, 15, 61.1

(56) References Cited

U.S. PATENT DOCUMENTS

| | | | | | |
|---|---|---|---|---|---|
| 58,086 | A | * | 9/1866 | Fletcher | ...................... 418/173 |
| 1,410,099 | A | * | 3/1922 | Hansen | ...................... 418/173 |
| 1,594,035 | A | * | 7/1926 | Bailey | ...................... 418/173 |
| 1,741,084 | A | * | 12/1929 | Tuscher | ...................... 418/173 |
| 1,828,245 | A | * | 10/1931 | Davidson | ...................... 418/173 |
| 1,941,651 | A | * | 1/1934 | Behlmer | ...................... 418/173 |
| 1,943,637 | A | * | 1/1934 | Sturm | ...................... 418/173 |
| 1,961,592 | A | | 6/1934 | Muller | |
| 2,002,827 | A | * | 5/1935 | Morch | ...................... 418/173 |
| 2,580,006 | A | | 12/1951 | Densham | |
| 2,673,448 | A | * | 3/1954 | Wheeler | ...................... 418/173 |
| 2,714,372 | A | * | 8/1955 | Williams | ...................... 418/173 |
| 4,484,556 | A | * | 11/1984 | Okimoto et al. | ......... 123/559.1 |
| 4,702,219 | A | * | 10/1987 | Tadokoro et al. | ........ 123/559.1 |

FOREIGN PATENT DOCUMENTS

| | | | | |
|---|---|---|---|---|
| GB | 201 854 A | | 8/1923 | |
| GB | 809 220 A | | 2/1959 | |
| JP | 359119018 A | * | 7/1984 | .................. 60/397 |

* cited by examiner

Primary Examiner—Thomas Denion
Assistant Examiner—Thai Ba Trieu
(74) Attorney, Agent, or Firm—Ephraim Starr; Grant Langton

(57) ABSTRACT

A throttle loss recovery turbine and supercharger device (10) comprises a housing (12) having a movable intake port (36) and a separately movable exhaust port (38). An outer drum is rotatably placed within the housing. An inner drum (24) is rotatably disposed within the housing, and within an inside diameter of the outer drum (18). The inner drum has an axis of rotation (30) eccentric to an axis of rotation of the outer drum, defining a variable volume annular space (26) therebetween. The inner and outer drum are configured to rotate within the housing at a 1:1 ratio with one another, and the intake and exhaust ports are each in air flow communication with some portion of the annular space. A number of vanes (20) are each interposed radially between the inner and outer drums. Each vane is pivotably attached at one end (22) to the outer drum, and is attached at an opposite end to the inner drum. At least one drum is coupled to an engine crankshaft. At low load or idle throttle conditions, the device is operated in a throttle loss mode to transfer rotational energy to the engine, and at high load or wide open throttle conditions the device is operated to produce pressurized air to the engine for subsequent combustion.

18 Claims, 2 Drawing Sheets

THROTTLE LOSS RECOVERY TURBINE AND SUPERCHARGER

CROSS REFERENCE TO RELATED APPLICATIONS

This application claims the priority of copending application Serial No. 60/249,472 filed on Nov. 17, 2000 having the same title as the present application.

FIELD OF THE INVENTION

This invention relates generally to the field of superchargers as used with internal combustion engines and, more particularly, to a vaned device used to control air flow into a gasoline-powered internal combustion engine, which device operates to both provide energy to such engine during low throttle conditions, and to provide supercharged intake air to an engine during high throttle conditions.

BACKGROUND OF THE INVENTION

Superchargers and turbochargers for gasoline and diesel internal combustion engines are known devices used in the art for pressurizing or boosting the pressure of an intake air stream that is routed to a combustion chamber of the engine. In a turbocharger, the boost air is provided by a compressor that is driven by the heat and volumetric flow of exhaust gas exiting the engine. In a supercharger, the boost air is provided by a compressor or gears that are driven by the engine crankshaft via one or more belts or gears. Because of the manner that superchargers are driven by the engine, a horsepower loss is incurred by their operation. However, the horsepower loss associated with driving the supercharger is more than offset by the horsepower increase provided by the supercharged intake air directed to the engine for combustion at full load conditions.

Thus, superchargers are driven by the engine crankshaft to rotate an internal member that causes the pressure of intake air directed to the engine to be boosted. When used with a gasoline-powered internal combustion engine, an increase in throttle operating condition results in greater pressurized air flow into the engine for combustion. A decrease or reduction in throttle operating condition causes a reduction in the amount of air flow into the engine.

During engine "throttling", e.g., reduction of throttle position for purposes of vehicle speed control, the amount of air flow being directed to the engine is reduced, thereby reducing the operating efficiency of the engine. The reduction of operating efficiency during such throttling condition is referred to as "throttle loss," and is a well known occurring condition with gasoline-powered internal combustion engines. In supercharged engine systems, however, the operating efficiency of the engine during such throttling condition is further reduced/exacerbated due to the fact that the supercharger is simultaneously being driven by the engine, i.e., taking energy from the engine.

It is, therefore, desired that a device be constructed that is capable of both providing a desired degree of supercharging, i.e., providing a desired degree of intake air pressurizing, during on-throttle conditions, and minimize engine operating efficiency loss during off-throttle or throttling conditions, i.e., provide throttle loss recovery. It is desired that such a device be capable of being attached to an engine and/or within an engine compartment with a minimum amount of alteration when compared to conventional supercharger systems.

SUMMARY OF THE INVENTION

A throttle loss recovery turbine and supercharger device is constructed, according to the principles of this invention, for placement within an engine intake system replacing conventional means for controlling airflow for combustion. The device comprises a housing, that is generally cylindrical in shape, and that includes a movable intake (or air inlet) port and an exhaust (or air outlet) port that is movable independent of the intake port. In an example embodiment, the intake and exhaust ports are disposed through end plates that are attached to each axial housing end.

An outer rotary member or drum is rotatably disposed within the housing, and a plurality of bearings are interposed between an inside wall surface of the housing and an outside wall surface of the outer drum to facilitate outer drum rotation within the housing. An inner rotary member or drum is rotatably disposed within the housing and within an inside diameter of the outer drum. The inner drum has an axis of rotation that is eccentric to an axis of rotation of the outer drum, and the inner and outer drum are configured to rotate within the housing at a 1:1 ratio with one another. A variable volume annular space is defined within the housing between the inner and outer drums, and the intake and exhaust ports are each in air flow communication with some portion of the annular space;

The device comprises a number of vanes that are each interposed radially between the inner and outer drums. Each vane is pivotably attached at one of its ends to a portion of the outer drum. An opposite end of each vane is disposed within a portion of the inner drum outside diameter that is configured to facilitate reciprocating and pivoting movement of the vane end therein. The device includes a means for connecting at least one of said drums to an engine crankshaft.

When the engine is operated at a low load or idle throttle condition, the device is placed into a throttle loss recovery mode to generate and transmit power to the engine. The device does this by moving the intake port within the housing to a position adjacent a minimum of the annular volume space between the rotating drums, and moving the exhaust port within the housing to a position adjacent a maximum of the annular volume space. Placed in this configuration, air entering the device moves from a position of small volume to large volume, operating to effect rotation of the drums, which rotary energy is transmitted to the engine via the connecting means.

When the engine is operated at a high load or wide open throttle condition, the device is placed into a supercharger mode to generate pressurized air to the engine intake system for subsequent combustion. The device does this by moving the intake port within the housing to a position adjacent a maximum of the annular volume space between the rotating drums, and moving the exhaust port within the housing to a position adjacent a minimum of the annular volume space. Placed in this configuration, air entering the device moves from a position of large volume to small volume, operating to pressurize the air moving through the device, which pressurized air is routed to the engine for combustion.

BRIEF DESCRIPTION OF THE DRAWINGS

The details and features of the present invention will be more clearly understood with respect to the detailed description and the following drawings, wherein.

DETAILED DESCRIPTION OF THE INVENTION

A throttle loss recovery turbine and supercharger device, constructed according to principles of this invention, for use with an internal combustion engine is generally in the form of an eccentric pump having rotating internal members and air-tight vanes that are in air-flow communication with the engine air supply and air intake systems. The device is attached by belt, gear or the like attachment to the engine crankshaft. The device is configured to produce pressurized intake air and directed the same to an engine for combustion under operating conditions of increased load/throttle application (i.e., positive delta pressure) to increase engine performance, and to receive supply air under operating conditions of reduced load/throttle application (i.e., negative delta pressure) and directed the same to the engine while transmitting energy to the engine (thereby increasing engine operating efficiency) by belt or gear connection to the engine crankshaft.

Figure 1:
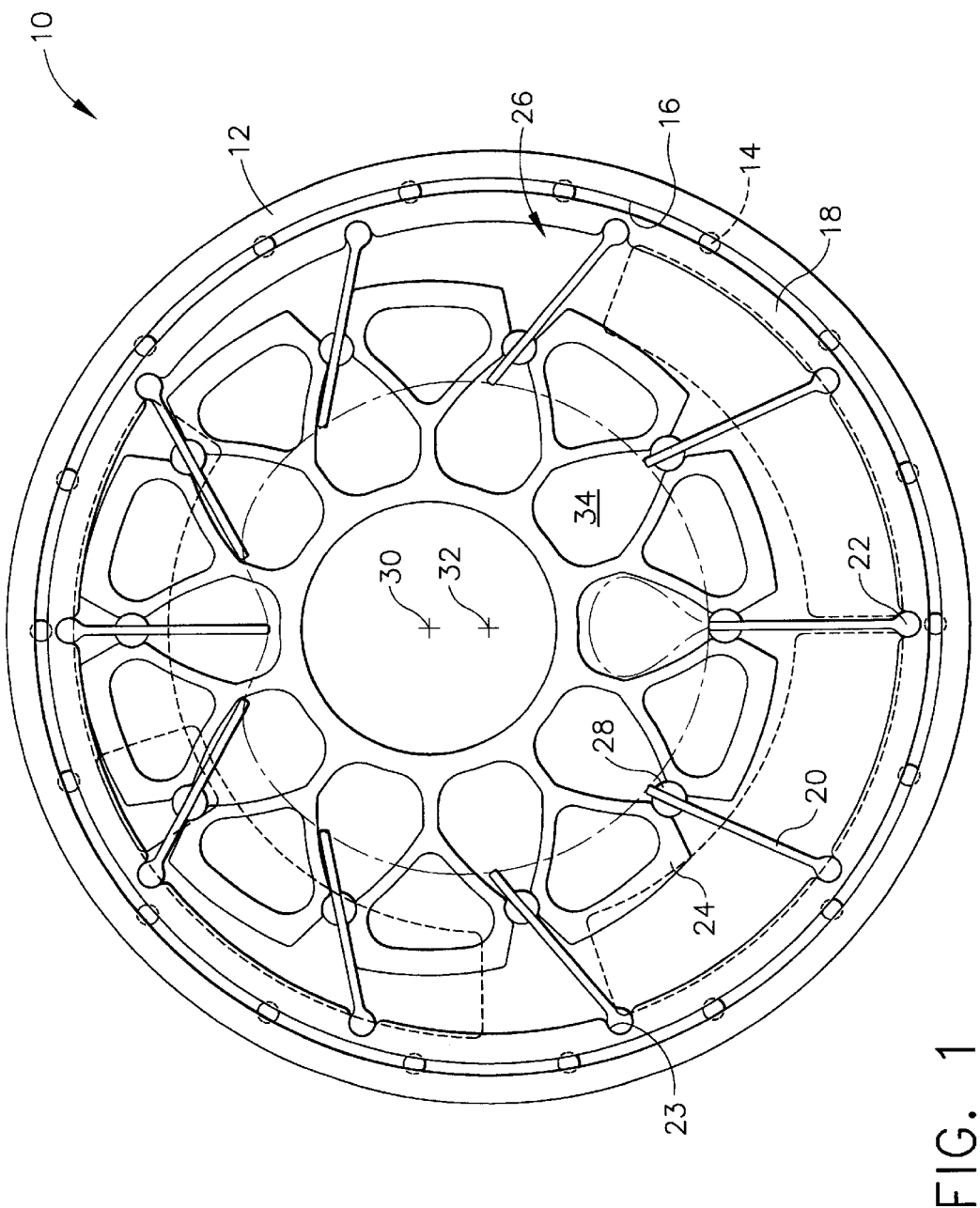
FIG. 1 illustrates a schematic cross-sectional side elevation of a throttle loss recovery/supercharger device constructed according to principles of this invention.

FIG. 1 illustrates a throttle loss recovery/supercharger device 10, constructed according to principles of this invention, comprising a housing 12 in the form of a cylinder that extends between, and that is attached to, axial end plates (not shown). The axial end plates attached to the housing provide an airtight seal therewith. Moving radially inwardly from the housing 12, the device comprises a plurality of bearings 14 disposed within complementary races along in inside diameter housing wall surface 16. The bearings 14 are preferably positioned at equidistant intervals along the inside wall surface 16 and function to facilitate rotatable movement of an outer drum 18. While bearings 14 have been described and illustrated as means for accommodating rotational movement of the outer drum, other devices can be used within the scope of this invention to permit such rotational movement.

The outer drum 18 is generally in the form of a cylinder disposed concentrically within the housing 12, having an outside diameter surface in contact with the plurality of bearings 14, and having an axial length similar to that of the housing. The outer drum 18 is rotated within the housing by a gear (not shown) that extends from an axial end plate and that is ultimately connected to an engine crankshaft.

A plurality of vanes 20 are pivotably attached at each vane end 22 to the outer member 16 by an air-tight limited motion bearing 23 such that each vane projects radially inwardly a distance from the outer drum. Each vane has a generally planar configuration extending from the outer drum, and is designed to have a determined amount of angular deflection (i.e., pivot window) relative to the outer drum inside wall surface 16. The movement of the vanes 20 within the device will be better understood in the context of the rotational movement of the outer drum 18 and an inner drum as described below.

An inner drum 24 is positioned within the housing 12 and concentrically within the outer drum 18. The inner drum has an outside diameter that is less than that of the outer drum inside diameter, thereby creating an annular space 26 therebetween. The inner drum 24 has the same axial length as the outer drum 18. The inside drum 24 includes a plurality of air-tight limited motion sliding/rotating bearings 28 that are attached along an outside diameter surface, and that are each designed to capture a distal end of a respective vane 20 that is opposite to the outer drum.

Configured in this manner, a portion of each vane opposite the vane end 22 is disposed within a bearing 28 of the inner member to facilitate both angular vane movement and reciprocating vane movement therein. The inner drum 24 is geared to rotate, via gears disposed outside of the housing, within the housing with the outer drum 18 at a 1:1 ratio. The inner drum 24 has an axis of rotation 30 that is eccentric to an axis of rotation 32 for the outer member 16.

The inner drum 24 includes a general structural construction that accommodates the angular deflection and reciprocating movement of the vanes therein. In preferred embodiment, the inner drum includes a plurality of vane chambers 34 that are configured to receive a distal end of a respective vane 20 therein and accommodate the full range of vane angular deflection and insertion therein as the inner and outer drums are rotated within the housing. As shown in FIG. 1, each vane undergoes a repeating pattern of axial and reciprocating displacement within a respective vane chamber 34 as it rotates 360 degrees within the housing.

Starting from the 12:00 o'clock position, each vane is at its maximum insertion depth within its respective chamber 34 and has an angular deflection of approximately zero. As the inner and outer drums are rotated clockwise, the vane insertion depth lessens and the vane becomes angularly deflected to the left (negative—as viewed from the inner drum axis). The vane insertion depth and angular deflection within the chamber each lessens as the inner and outer drums are rotated towards the 180 degree point, where the vane insertion depth is at a minimum and the vane angular deflection is again zero. As the inner and outer drums rotate back towards the 12:00 o'clock position, the vane insertion depth within the chamber increases and the vane becomes angularly deflected within the chamber to the right (positive—as viewed from the inner drum axis).

Together, the limited motion bearings 23 in the outer drum 18, the sliding/rotating bearings 28 in the inner drum 24, and the inner drum vane chambers 34 function to enable reciprocating and angular deflection vane movement between the inner and outer drums as they are rotated about their respective axis within the housing.

Figure 2:
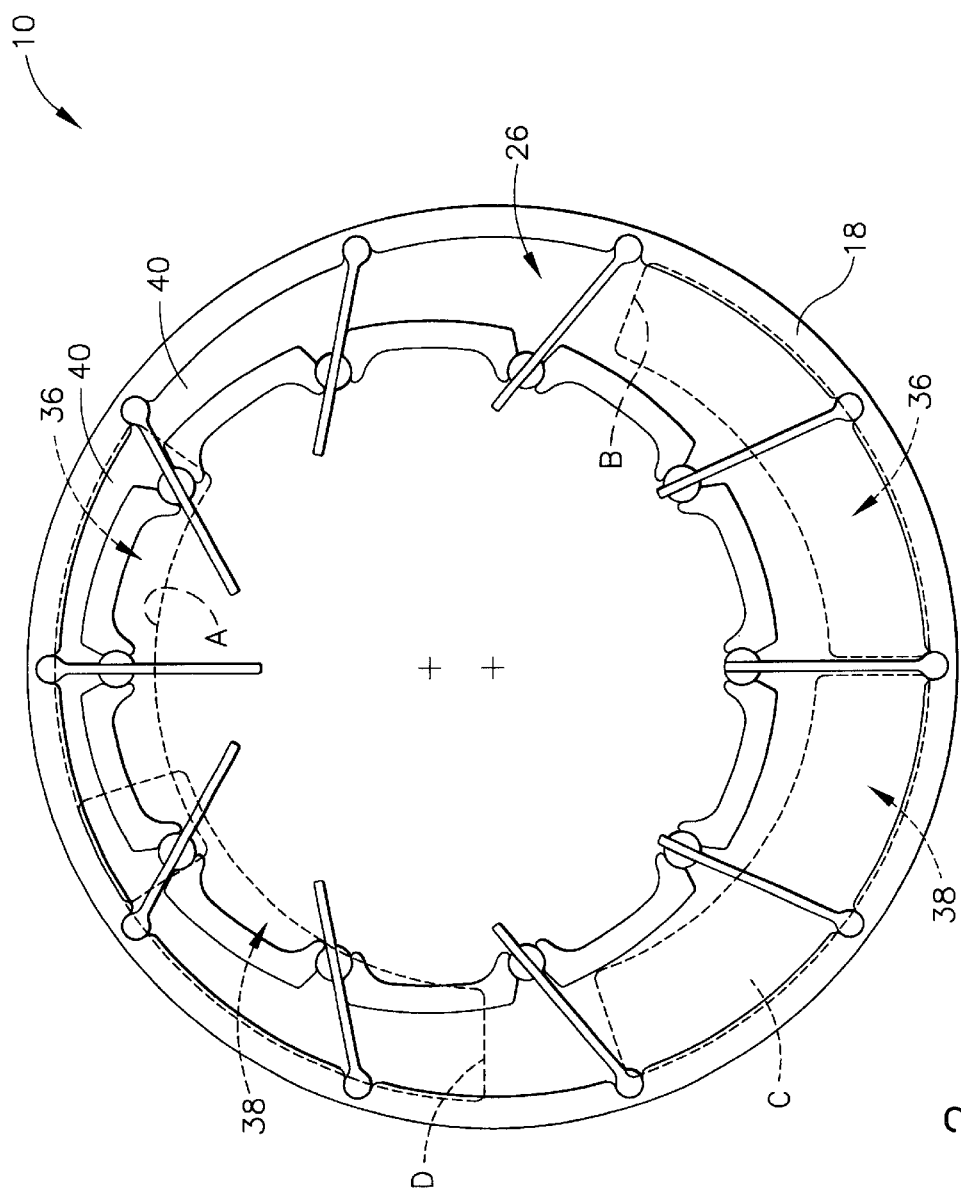
FIG. 2 illustrates a schematic cross-sectional side elevation of the throttle loss recovery/supercharger device of FIG. 1.

Referring now to FIG. 2, the device 10 includes an air inlet or intake air port 36 disposed in one of the housing axial end plates, and an air outlet or exhaust port 38 disposed in the same or an opposite housing axial end plate. The intake port 36 and exhaust port 38 can be located at the same axial housing end. Whether disposed at opposite or identical axial housing ends, it is necessary that the intake and exhaust ports be allowed to rotate vis-a-vis the housing independently of one another for reasons discussed below. Additionally, it is to be understood that the air inlet and air outlet ports may be disposed radially along the housing.

The intake air port 36 is in air flow communication with the upstream portion of an engine air intake system (the air supply portion of a conventional air intake system before the throttle valve or butterfly, e.g., the air filter). The exhaust port 38 is in air flow communication with the downstream portion of an engine air intake system (the portion of a conventional air intake system after the throttle valve or butterfly valve, e.g., the engine intake manifold). The device 10 is used to replace the throttle valve (or other air flow controlling device) in a conventional fuel injected air intake system so that the air leaving the device via the exhaust port 38 is routed to the engine intake manifold, where fuel can be added thereto via fuel injectors for subsequent combustion within the engine combustion chambers.

The intake and exhaust ports 36 and 38, and respective axial end plates in an example embodiment, are each designed to rotate independently of one another about the housing depending on the particular engine operating condition. Position A, in FIG. 2, designates the rotational location of the intake port 36 when the engine is operated at idle or at low load/throttle conditions, i.e., when the device is operated in a throttle loss recovery mode. Under idle and low load/throttle engine operating conditions the intake port 36 is positioned at a point where the annular space 26 between the inner and outer drums is at or near a minimum; in this example, at a 12:00 o'clock position within the housing. Under these operating conditions the exhaust port 38 is located at position C, i.e., at a position near a maximum volume of the annular space; in this example, at a 7:00 o'clock position within the housing. Air entering the device 10, via the intake port 36 under idle or low load/throttle engine conditions, imposes work on the device by pressurizing air spaces 40, formed between adjacent vanes and the inner and outer drum surface, causing the inner and outer drums to be rotated. This pressurization is caused by the difference in air pressure that exists in the device between the air inlet and air outlet, wherein in this operating condition the air inlet is at a higher air pressure than the air outlet.

In an example embodiment, such pressurizing action causes the inner and outer drums to be rotated in a clockwise direction within the housing from a position of minimum air space 40 volume (at the 12:00 o'clock position) to a position of maximum air space 40 volume (at the 6:00 o'clock position). Rotational movement of the inner and outer drums is conveyed to the engine via belt or gear connection to the engine crankshaft directly or through a paired electrical motor/generator arrangement.

As the engine operating conditions change and the amount of throttle position increases to high load or wide open throttle conditions, the intake port 36 position rotates vis-a-vis the housing to a new position B, while the exhaust port 38 stays at position C. As the intake air demand to the engine increases it is desired that the device transition from throttle loss recovery mode to supercharger mode. It is desired, however, that the transition be seamless so that it does not adversely effect engine performance. This is achieved by rotating the intake port to its supercharging position B (at a position of approximately 5:00 o'clock within the housing) while the exhaust port position remains stationary. Under continued high load or wide open throttle conditions, the device converts from normally-aspirated wide open throttle operation to supercharged exhaust operation by the rotation of the exhaust port from position C to position D. When operated in a supercharging mode, the air enters the device via the intake port 36 at position B and is pressurized within the air spaces 40 as the inner and outer drums are rotated clockwise and the volume of the air spaces between the drums and respective vanes is reduced.

As the throttle position is reduced from high load or wide open throttle, the exhaust port 38 rotates to its normally-aspirated position C within the housing, and the intake port 36 rotates from position B to position A to reestablish throttle loss recovery operation. Rotational movement of the intake and exhaust ports 36 and 38 is achieved by linkage attached either directly or indirectly to the vehicle throttle or accelerator pedal.

A device having a specifically arranged inner and outer drum and intake and exhaust ports has been described and illustrated. It is to be understood that devices having other arrangements of inner and outer drums, and intake and exhaust ports, are intended to be within the scope of this invention. For example, the device of this invention can be configured with the rotational axis of the inner and outer drum positioned differently so that a minimum annular space 26 occurs at a location other than at a 12:00 o'clock position within the housing. Similarly, the device of this invention can be configured having an intake and exhaust port positioned differently so that position A is not at a 12:00 o'clock position in the housing.

The arrangement of eccentric inner and outer drums, vanes, annular space positioned therebetween, and intake and exhaust ports, enable the above-described and illustrated device to function as: (1) a crankshaft-driven supercharger to provide pressurized air to an engine intake for combustion; and (2) a turbine that transfers power to the crankshaft from intake air received during idle or low load/throttle conditions. The device efficiently performs both of these functions because it has been designed having a high volumetric efficiency and high expansion ratios, and having a very low dead volume within the annular space, i.e., having a very low residual volume at a minimum volume point of the space. The device is also designed having a large displacement volume to achieve good packaging within a vehicle engine compartment. Additionally, the vanes are designed so that they do not interfere with each other as they transition in and out of the device minimum volume point (i.e., at the 12:00 o'clock position). The above described and illustrated device functions in the intended manner to achieve each of these goals through innovative selection of the inner drum outside diameter, outer drum inside diameter, the eccentricity and points chosen for the bearing centers used to mount the inner and outer drums.

Having now described the invention in detail as required by the patent statutes, those skilled in the art will recognize modifications and substitutions to the specific embodiments disclosed herein. For example, it is to be understood that the device of this invention can be configured having rotating intake and exhaust port that are positioned radially along the housing outside diameter surface, rather than axially along the housing end plates, or can include intake and exhaust ports that are positioned both axially and radially. Such modifications are within the scope and intent of the present invention.

What is claimed is:

1. A throttle loss recovery turbine and supercharger device comprising:
    a device housing comprising:
        an intake port disposed through and movable relative to the housing;
        an exhaust port disposed through and movable relative to the housing, the exhaust port being movable independent of the intake port;
    an outer drum rotatably disposed within the housing;
    an inner drum rotatably disposed within the housing and within an inside diameter of the outer drum, wherein the inner drum has an axis of rotation that is eccentric to an axis of rotation of the outer drum defining a variable volume annular space there between, wherein the inner and outer drum rotate within the housing at a 1:1 ratio with one another, and wherein the intake and exhaust ports are in air flow communication with the annular space;
    a number of vanes interposed radially between the inner and outer drums, wherein each vane is pivotably attached at one end to the outer drum, and wherein an opposite vane end is disposed within the inner drum outside diameter to facilitate reciprocating and pivoting movement therein; and
    means for connecting at least one of said drums to an engine crankshaft.

2. The device as recited in claim 1 wherein the housing is generally cylindrical and includes end plates on each opposite axial end, and wherein the intake port and exhaust port are each disposed through the same or different end plate.

3. The device as recited in claim 2 wherein the end plates comprising the intake and exhaust port are configured to rotate relative to the housing.

4. The device as recited in claim 2 wherein the intake port is in airflow communication with an engine air intake system for receiving air prior to introduction into an engine intake system, and wherein the exhaust port is in air-flow communication with an engine intake system for directing air from the device into the engine.

5. The device as recited in claim 2 comprising means for moving the end plates, and rotating the placement of intake and exhaust ports relative to the annular space between the inner and outer drums, based on engine throttle condition.

6. The device as recited in claim 5 wherein the intake port is positioned in the housing at a point of minimum annular space volume when the engine throttle is at idle or low throttle operating conditions.

7. The device as recited in claim 6 wherein the exhaust port is positioned in the housing at a point adjacent a maximum annular space volume when the engine throttle is at idle or low throttle operating conditions.

8. The device as recited in claim 5 wherein the intake port is positioned in the housing at a point of maximum annular space volume when the engine throttle is at wide open operating conditions.

9. The device as recited in claim 8 wherein the exhaust port is positioned in the housing adjacent a minimum annular space volume when the engine throttle is at wide open operating conditions.

10. A throttle loss recovery turbine and supercharger device comprising:
a housing having a movable intake port and a movable exhaust port each disposed through the housing;
an outer drum rotatably disposed within the housing;
a plurality of bearings interposed between an inside wall surface of the housing and an outside wall surface of the outer drum to facilitate rotatable outer drum movement;
an inner drum rotatably disposed within the housing and within an inside diameter of the outer drum, wherein the inner drum has an axis of rotation that is eccentric to an axis of rotation of the outer drum, wherein the inner and outer drum rotate within the housing at a 1:1 ratio with one another, wherein a variable volume annular space is defined within the housing between the inner and outer drums, wherein the intake and exhaust ports are in air flow communication with the annular space;
a number of vanes interposed radially between the inner and outer drums, wherein each vane is pivotably attached at one end to the outer drum, and wherein an opposite vane end is disposed within the inner drum outside diameter to facilitate reciprocating and pivoting movement therein;
means for connecting the inner and outer drums to an engine crankshaft; and
means for controlling intake port and exhaust port position within the housing according to engine throttle operating condition.

11. The device as recited in claim 10 wherein the intake port is movable from a position in the housing adjacent a minimum volume annular space, to a position in the housing adjacent a maximum volume annular space when the engine throttle is moved from a low throttle operating condition to a wide open throttle operating condition.

12. The device as recited in claim 11 wherein the exhaust port is movable from a position in the housing adjacent a maximum volume annular space, to a position in the housing adjacent a minimum volume annular space when the engine throttle is moved from a low throttle operating condition to a wide open throttle operating condition.

13. The device as recited in claim 10 wherein when the engine throttle is operated in a low throttle operating condition, the air pressure at the intake port is greater than that at the exhaust port, and the movement of air through the device causes the inner and outer drums to turn and transfer energy to the engine by the means for connecting.

14. The device as recited in claim 10 wherein when the engine throttle is operated in a wide open throttle operating condition, the rotational movement of the inner and outer drums operates to compress the air within the housing so that the air at the exhaust port is at a greater pressure than the air at the intake port.

15. The device as recited in claim 10 wherein the inner drum comprises a number of vane chambers each disposed a distance radially inwardly from an inner drum outside surface, each vane chamber being sized and shaped to accommodate vane end reciprocating and angular movement therein.

16. The device as recited in claim 15 wherein the inner drum further comprises a leak-tight bearing positioned at an opening of each vane chamber for accommodating placement of a variable portion of the vane therein.

17. A device for pressurizing intake air for combustion and providing rotational energy to an engine by crankshaft, the device comprising:
a generally cylindrical housing having end plates at each housing axial end;
an air intake port in air-flow communication with an air inlet stream, the intake port being disposed through one of the end plates and being rotationally movable within the housing;
an air outlet port in air-flow communication with an engine air intake system, the outlet port being disposed through one of the end plates and being rotational movable within the housing independent from the intake port;
an outer drum rotationally disposed within the housing;
an inner drum disposed concentrically within the outer drum and rotationally disposed within the housing, wherein the inner drum has an axis of rotation different than that of the outer drum and rotates within the housing at a 1:1 ratio with the outer drum;
a plurality of vanes interposed radially between the inner and outer drums, each vane comprising a first vane end that is pivotably attached to the outer drum, and an opposite second vane end that is attached to the inner drum, wherein the inner drum includes a number of vane chambers disposed therein and a leak-tight bearing positioned at an entry to each vane chamber, wherein the second vane end is accommodated through a respective bearing and within a respective vane chambers to accommodate reciprocating and angular second vane end movement;
means for connecting the inner and outer drums to an engine crankshaft; and
means for moving the intake and outlet ports in response to engine throttle operating conditions.

18. A method for providing supercharged air or rotational energy to an engine depending on engine throttle operating conditions, the method comprising:

sensing engine throttle operating condition and during engine idle or low throttle operating conditions:

moving an intake port in a supercharger/throttle loss recovery turbine to a position of minimum annular volume between eccentrically rotating members that are connected to an engine crankshaft, and moving an outlet port in the supercharger/throttle loss recovery turbine to a position of maximum annular volume between the rotating members, wherein the movement of air through the turbine operates to effect rotation of the rotating members and deliver rotational energy to the engine;

sensing engine throttle operating condition and during engine high or wide open throttle operating conditions:

moving an intake port in a supercharger/throttle loss recovery turbine to a position of maximum annular volume between the rotating members, and moving an outlet port in the turbine to a position of minimum annular volume between the rotating members, wherein rotation of the rotating members operates to pressurize air within the turbine that is directed to an engine intake system for combustion.

* * * * *